United States Patent
Chen et al.

(10) Patent No.: US 10,389,267 B2
(45) Date of Patent: Aug. 20, 2019

(54) SINGLE-STAGE THREE-PHASE POWER SUPPLY CONVERSION DEVICE AND POWER LINE TRANSMISSION DEVICE

(71) Applicant: Weilun Chen, Beijing (CN)

(72) Inventors: Weilun Chen, Beijing (CN); Steve Jun Chen, Singapore (SG)

(*) Notice: Subject to any disclaimer, the term of this patent is extended or adjusted under 35 U.S.C. 154(b) by 0 days.

(21) Appl. No.: 16/054,876

(22) Filed: Aug. 3, 2018

(65) Prior Publication Data

US 2018/0342962 A1 Nov. 29, 2018

Related U.S. Application Data

(63) Continuation of application No. PCT/CN2016/073714, filed on Feb. 6, 2016.

(51) Int. Cl.
*H02M 7/217* (2006.01)
*H02M 3/335* (2006.01)
*H02M 7/219* (2006.01)

(52) U.S. Cl.
CPC ..... *H02M 7/2173* (2013.01); *H02M 3/33569* (2013.01); *H02M 7/217* (2013.01); *H02M 7/219* (2013.01)

(58) Field of Classification Search
CPC .................. H02M 7/06; H02M 7/217; H02M 2001/0083; H02M 5/4585; H02M 1/10; Y02B 70/126
USPC ........ 363/16–20, 21.02, 37–41, 65, 71, 125, 363/127, 144, 142
See application file for complete search history.

(56) References Cited

U.S. PATENT DOCUMENTS

| | | | | |
|---|---|---|---|---|
| 4,721,897 A | * | 1/1988 | Matsuse ................ | H02J 3/1892 318/767 |
| 4,884,182 A | * | 11/1989 | Ando .................. | H02M 5/4585 363/37 |
| 5,574,636 A | * | 11/1996 | Lee ...................... | H02M 5/4585 363/132 |
| 5,936,855 A | * | 8/1999 | Salmon ............... | H02M 1/4216 363/46 |
| 8,792,254 B2 | * | 7/2014 | Reddy ................... | H02M 3/285 363/21.02 |

(Continued)

OTHER PUBLICATIONS

Internation Search Report of PCT/CN2016/073714, dated Nov. 8, 2016.

*Primary Examiner* — Rajnikant B Patel
(74) *Attorney, Agent, or Firm* — Erson IP (Nelson IP)

(57) ABSTRACT

A single-stage three-phase power supply conversion device includes a three-phase rectification and commutation module and a DC/DC conversion module; the three-phase rectification and commutation module has a three-phase AC connection end, a DC source first connection end, a DC source second connection end and a DC source third connection end, and the DC/DC conversion module has a first connection end, a second connection end, a third connection end, a DC source positive connection end and a DC source negative connection end; a three-phase AC source is connected to the three-phase AC connection end of the three-phase rectification and commutation module, the DC source first connection end of the three-phase rectification and commutation module is connected to the first connection end of the DC/DC conversion module, the DC source second connection end is connected to the second connection end of the DC/DC conversion module.

8 Claims, 10 Drawing Sheets

(56) References Cited

U.S. PATENT DOCUMENTS

| | | | |
|---|---|---|---|
| 9,236,812 B2* | 1/2016 | White | H02M 7/2173 |
| 9,595,883 B2* | 3/2017 | Nieberlein | H02M 1/4216 |
| 2012/0268976 A1 | 10/2012 | Yan et al. | |
| 2013/0182467 A1* | 7/2013 | Cross | H02J 3/36 |
| | | | 363/35 |

* cited by examiner

SINGLE-STAGE THREE-PHASE POWER SUPPLY CONVERSION DEVICE AND POWER LINE TRANSMISSION DEVICE

CROSS-REFERENCE TO RELATED APPLICATIONS

This application is a continuation of International Patent Application No. PCT/CN2016/073714 with a filing date of Feb. 6, 2016, designating the United States, now pending. The content of the aforementioned applications, including any intervening amendments thereto, are incorporated herein by reference.

TECHNICAL FIELD

The disclosure relates to three-phase switch power supply circuits, and particularly relates to a single-stage three-phase power supply conversion device and a power line transmission device.

BACKGROUND OF THE PRESENT INVENTION

Electric energy is the most widely and conveniently used energy among all the kinds of energy available to human beings. With quickening of global energy consumption, promotion of electric energy utilization efficiency, specially working efficiency of electric and electronic conversion power supply, has been increasingly gained attention. As an entrance power supply of electric equipment, its efficiency greatly influences the total efficiency of the equipment, and if the efficiency of exit and entrance power supply conversion cannot be improved, the total electric energy efficiency of the equipment can only be less than, instead of higher than, the efficiency of exit and entrance power supply conversion.

FIG. 1 shows an topological circuit application solution of a mainstream three-phase high-frequency AC/DC switch power supply in the prior art. A three-phase power supply 100 together with a DC/DC power supply conversion unit 105 constitutes all application solution of a three-phase two-stage high-frequency switch power supply topological circuit through a three-phase power factor correction unit having a "Vienna" structure and comprising high-frequency inductors 101, diodes 102, triodes 103 and energy-storage capacitors 104. The obvious defects of this solution are as follows: firstly, a specific two-stage high-frequency switch structure reduces the total conversion efficiency of the power supply; secondly, three high-frequency inductors 101 can significantly increase the total cost of the power supply; thirdly, eighteen high-frequency diodes 102 and three high-frequency switch triodes 103 can increase the total cost of the power supply; fourthly, two high-voltage energy-storage capacitors 104 can hinder further improvement of the service life of the power supply; fifthly, a "Vienna" preliminary stage being in power factor correction cannot work in a step-down but only voltage rising manner, and thus an output voltage is over high to bring great processing stress for a subsequent circuit; sixthly, due to existence of high-voltage energy-storage capacitance, electrified initial impact current is extremely large; seventhly, a control loop algorithm strategy of the three-phase high-frequency switch is high in complexity.

FIG. 2 shows another topological circuit application solution of a three-phase high-frequency inversion switch power supply. A three-phase power supply 200, a three-phase power frequency rectification or commutation unit including twelve high-frequency switch triodes 201 and, six high-frequency switch diodes 202, two filter energy-storage capacitors 203 and two DC/DC power supply conversion units 204 constitute a three-phase single-stage high-frequency switch power supply topological circuit, so as to form a three-phase AC/DC application solution, or a DC/AC three-phase application solution, or a three-phase power supply bi-directional converter application solution. However, since there are too many elements in a three-phase power frequency rectification or commutation unit, conduction loss when large current passes is increased, and when a circuit of a DC/DC unit is in a DC/DC converter operating mode, it belongs to a non-return-zero power. DC/DC circuit solution; when the circuit of the DC/DC unit is in an AC/DC transducer operating mode, it belongs to a non-return-zero constant-current power DC/DC circuit solution. However, this non-return-zero circuit solution in the prior art greatly restricts the selection flexibility of the DC/DC topological circuit so that some topological circuits having high conversion efficiencies difficulty take application advantages here.

SUMMARY OF PRESENT INVENTION

In order to further improve conversion efficiency of a power supply, an embodiment of the disclosure provides a singles age three-phase power supply conversion device for achieving AC/DC or DC/AC conversion between a three-phase AC source and a DC source and the single-stage three-phase power supply conversion device includes a three-phase rectification and commutation module and a DC/DC conversion module; the three-phase rectification and commutation module has a three-phase AC connection end, a DC source first connection end, a DC source second connection end and a DC source third connection end, and the DC/DC conversion module has a first connection end, a second connection end, a third connection end, a DC source positive connection end and a DC source negative connection end; the three-phase AC source is connected to the three-phase AC connection end of the three-phase rectification and commutation module, the DC source first connection end of the three-phase rectification and commutation module is connected to the first connection end of the DC/DC conversion module, the DC source second connection end is connected to the second connection end of the DC/DC conversion module, the DC source third connection end is connected to the third connection end of the DC/DC conversion module, the positive end of the DC source is connected to a DC source positive connection end of the DC/DC conversion module, and the negative end of the DC source is connected to the DC source negative connection end of the DC/DC conversion module. The three-topology single-stage (or single step) three-phase power supply conversion device is used for achieving AC/DC electric energy conversion between the three-phase AC source and the DC source or the DC load, or achieving DC/AC electric energy inversion and conversion between the DC source and the three-phase AC load. The power supply conversion solution provided in the disclosure further promotes power supply conversion efficiency while having intact power factor correction.

Meanwhile, the disclosure also provides a power line transmission device for transmitting electric power from a first three-phase AC power grid to a second three-phase AC power grid; the power line transmission device includes: two three-phase rectification and commutation modules; the two three-phase rectification and commutation modules each has a three-phase AC connection end, a DC source first connection end and a DC source second connection end and a DC source third connection end, respectively; the three-phase AC connection ends of one three-phase rectification and commutation modules are connected to the first three-phase AC power grid, the DC source first connection end of the three-phase rectification and commutation module is connected to the DC source first connection end of the other three-phase rectification and commutation module, the DC source second connection end is connected to the DC source second connection end of the other three-phase rectification and commutation module, the DC source third connection end is connected to the DC source third connection end of the other three-phase rectification and commutation module, and the three-phase AC connection end of the other three-phase rectification and commutation module is connected to the second three-phase AC power grid.

In order to make the above and other objects, features and advantages of the disclosure more clear and understandable, the disclosure will be described in detail below with reference to preferred embodiments and in combination with drawings.

DESCRIPTION OF THE DRAWINGS

In order to mate the technical solutions in the disclosure or in the prior art described more clearly, the drawings associated to the description of the embodiments or the prior art will be illustrated concisely hereinafter. Obviously, the drawings described below are only some embodiments according to the disclosure. Numerous drawings therein will be apparent to one of ordinary skill in the art based on the drawings described in the disclosure without creative efforts.

DETAILED DESCRIPTION OF PREFERRED EMBODIMENTS

The technical solution in embodiments of the disclosure will be clearly and completely described below with reference to accompanying drawings in embodiments of the disclosure. Obviously, the described embodiments are only one part of embodiments of the disclosure instead of all the embodiments. Based on embodiments of the disclosure, all other embodiments obtained by those of ordinary skill in the art without creative efforts belong to the protection scope of the disclosure.

Figure 3:
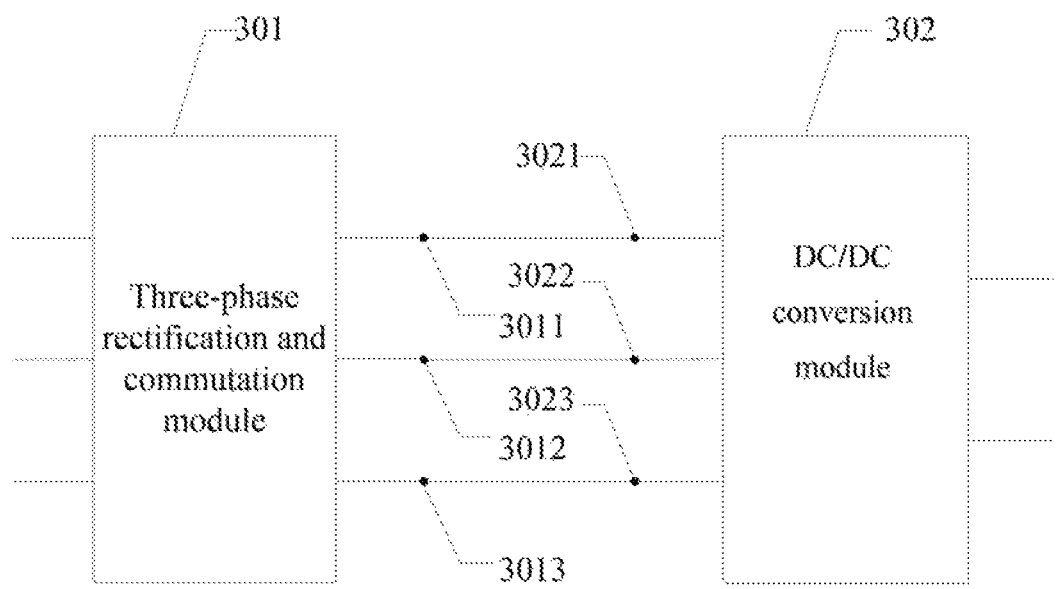
FIG. 3 is a structure block diagram of a single-stage three-phase power supply conversion device according to embodiments of the disclosure.

FIG. 3 is a structure block diagram of a single-stage three-phase power supply conversion device disclosed in the disclosure, which is used for achieving AC/DC or DC/AC conversion between a three-phase AC source and a DC source. The single-stage three-phase power supply conversion device includes: a three-phase rectification and commutation module 301 and a DC/DC conversion module 302; the three-phase rectification and commutation module 301 has a three-phase AC connection end, a DC source first connection end 3011, a DC source second connection end 3012 and a DC source third connection end 3013, and the DC/DC conversion module has a first connection end 3021, a second connection end 3022, a third connection end 3023, a DC source positive connection end and a DC source negative connection end.

The three-phase AC source is connected to the three-phase AC connection end of the three-phase rectification and commutation module, the DC source first connection end 3011 of the three-phase rectification and commutation module is connected to the first connection end 3021 of the DC/DC conversion module, the DC source second connection end 3012 is connected to the second connection end 3022 of the DC/DC conversion module, the DC source third connection end 3013 is connected to the third connection end 3023 of the DC/DC conversion module, a positive end of a DC source is connected to the DC source positive connection end of the DC/DC conversion module, and a negative end of the DC source is connected to the DC source negative connection end of the DC/DC conversion module.

Figure 4:
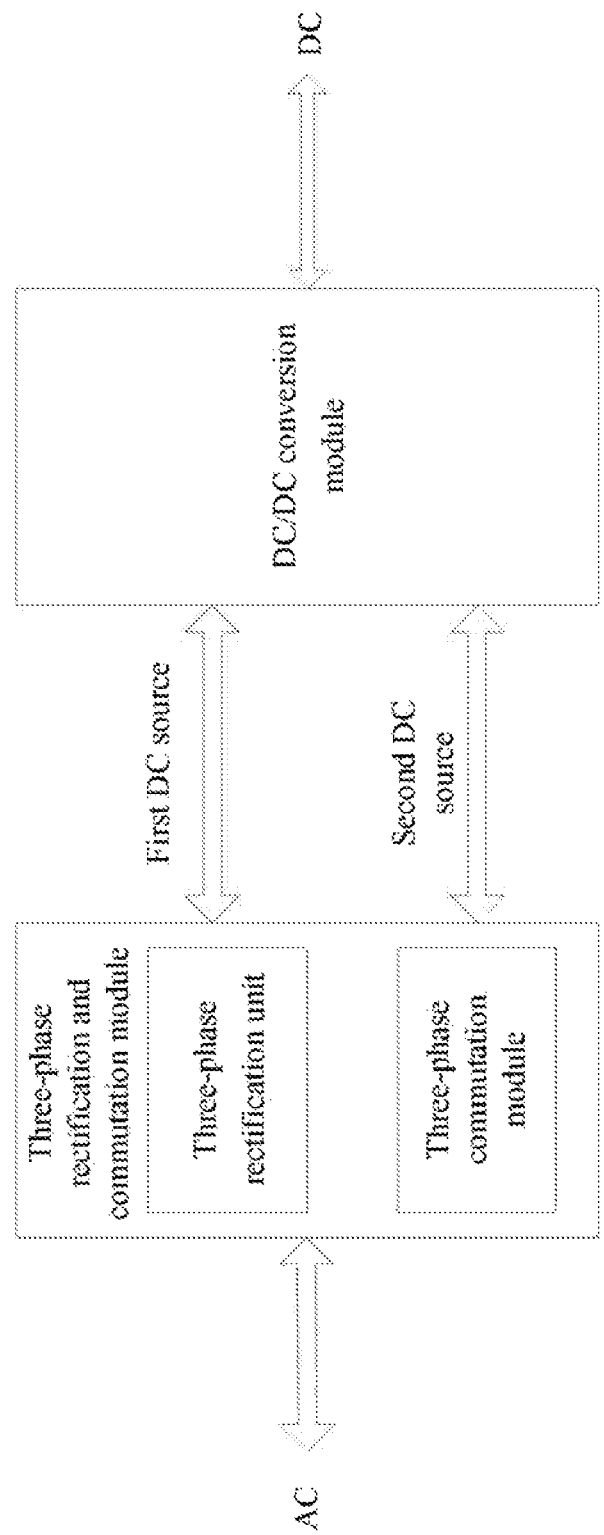
FIG. 4 is a block diagram of a single-stage three-phase power supply conversion device according to embodiments of the disclosure.

FIG. 4 is a block diagram of a single-stage three-phase power supply conversion device according to an embodiment of the disclosure. When AC/DC conversion is performed, the three-phase rectification and commutation module is used for converting three-phase alternating current input by a three-phase AC source into a first DC source and a second DC source, and the DC/DC conversion module performs power conversion on the first DC source and the second DC source into direct current to be output to the DC source; the three-phase rectification unit is used for converting three-phase alternating current into a first DC source; the three-phase commutation unit is used for converting three-phase alternating current into a second DC source.

When DC/AC inversion is performed, the DC/DC conversion module converts the DC source into a first DC source and a second DC source, the three-phase rectification and commutation module converts the first DC source and the second DC source into a three-phase alternating, current to be output to a three-phase AC power supply the three-phase rectification unit converts the first DC source into three-phase alternating current; the three-phase commutation unit is used for converting the second DC source into three-phase alternating current.

The technical solution of the disclosure will be described in detail in combination with embodiments.

Figure 1:
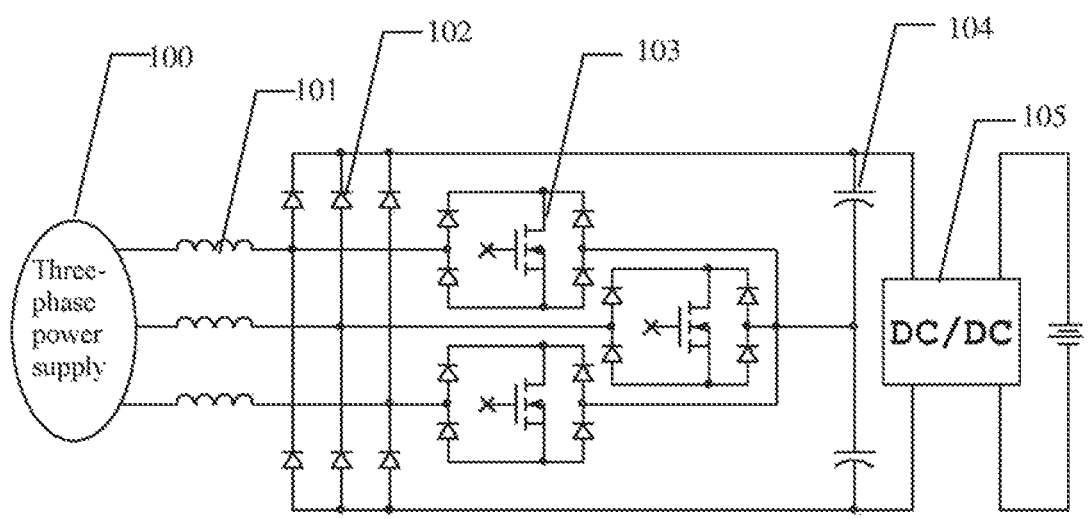
FIG. 1 is a three-phase high-frequency AC/DC switch power supply topological circuit in the prior art.
Figure 5:
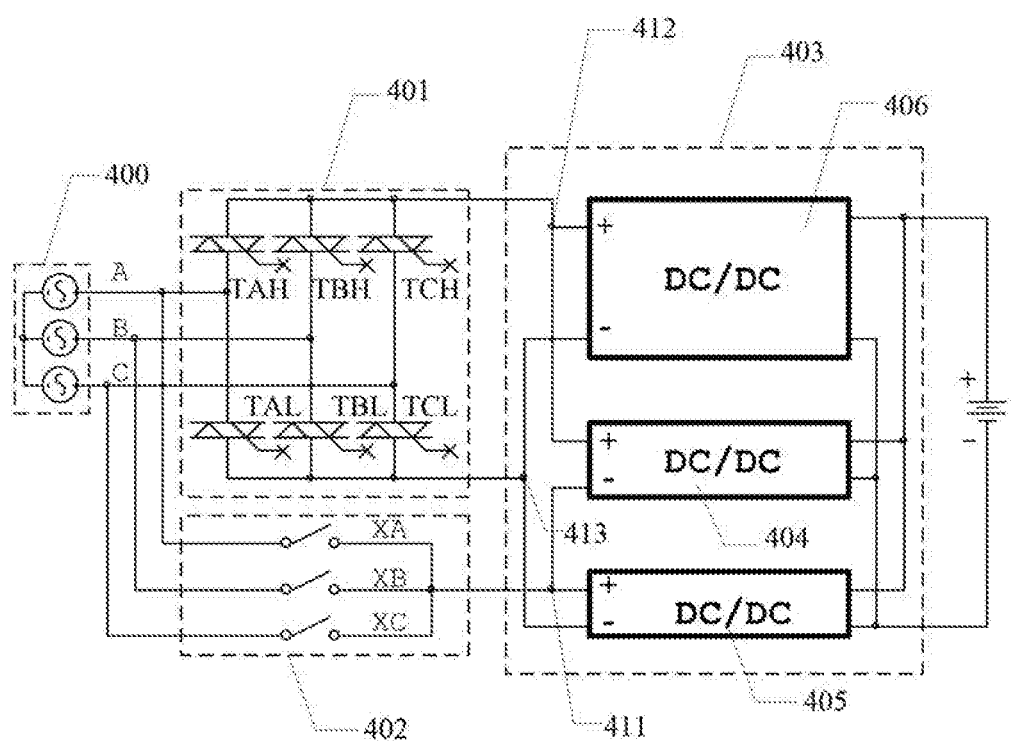
FIG. 5 is a structure principle block diagram of a single-stage switch power supply according to embodiments of the disclosure.

An embodiment of the disclosure discloses a three-phase single-stage switch power supply. FIG. 5 is a structure principle block diagram of a single-stage switch power supply disclosed by the disclosure. The three-phase single-stage switch power supply includes: a three-phase rectification unit 401 which converts a power diode in a circuit rectification bridge as shown in FIG. 1 into a triode in which current may bi-directionally flow to constitute a three-phase rectification bridge having a synchronous rectification circuit function, three three-phase connection ends of the three-phase rectification bridge are coupled to a three-phase AC power Supply 400, another two connection, ends of the three-phase rectification bridge are coupled to a DC source first connection end 412 and a DC source second connection end 413; the three-phase single-stage switch, power supply also includes a three-phase commutation unit 402 in which three three-phase connection ends are coupled to the three-phase alternating-current power supply 400, and a single-line end is coupled to a DC source third connection end 411; in an embodiment of the disclosure, switch symbols in the three-phase commutation unit 402 are actually achieved using the triode.

The three-phase single-stage switch power supply also includes a DC conversion unit 403 composed of a first DC/DC conversion unit 404, a second DC/DC conversion unit 405 and a third DC/DC conversion unit 406; a positive input end of the first DC/DC conversion unit 404 is connected with a first connection end 412 of a first DC power supply, a negative input end is coupled to a second connection end 411 of a second DC power supply; a positive input end of the second DC/DC conversion, unit 405 is coupled to the second connection end 411 of the second DC power supply, a negative input end is coupled to a third connection end 413 of a third DC power supply; a positive input end of the third DC/DC conversion unit 406 is coupled to the first connection end 412 of the first DC power supply a negative input end is coupled to the third connection end 411 of the third DC power supply; output positive ends and negative ends of three topological subunits are n three-three interconnection, respectively.

Figure 2:
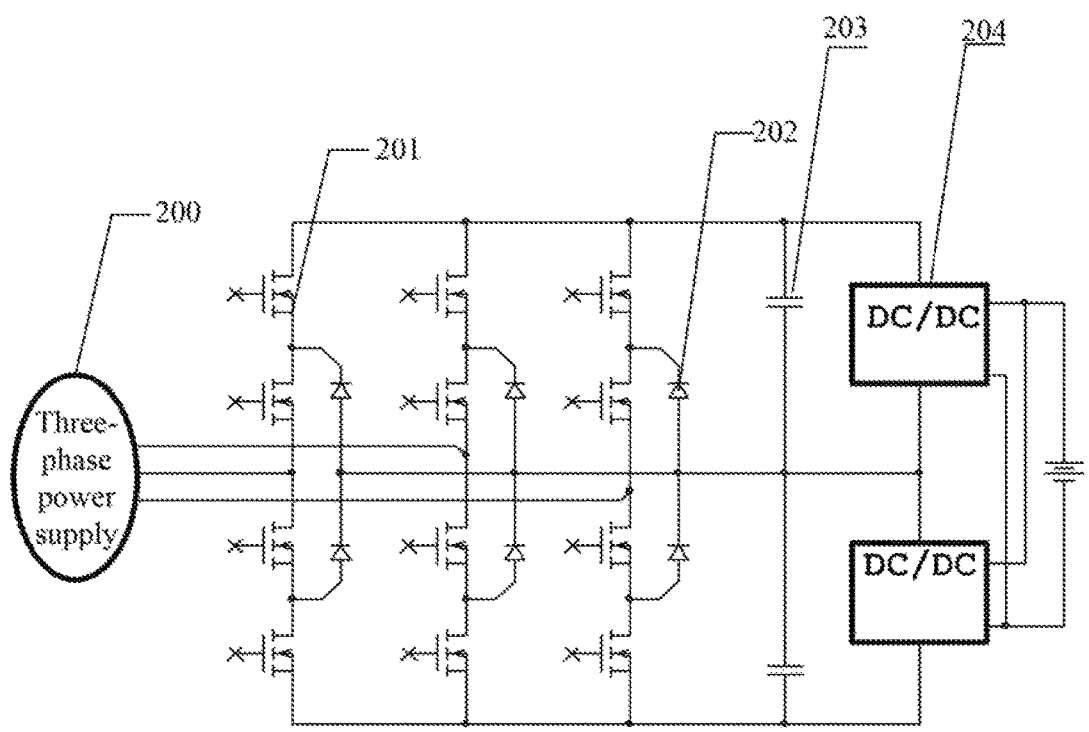
FIG. 2 is another topological circuit of a three-phase high-frequency inversion switch power supply in the prior art.

A circuit topology in an embodiment of the disclosure converts 12 synchronization rectification triodes 201 into 9 synchronization rectification triodes in FIG. 5 so that the number of control variables involved in the technical solution of the disclosure is reduced from 12 to 9, thereby obviously reducing the complexity of controlling rectification or commutation of the three-phase power supply; although in the DC/DC topological circuit of the disclosure, original two units are increased to three units, a benefit of use is brought, namely, control on each of three DC/DC topological circuits only needs to use a common current control single loop, the third DC/DC conversion topological circuit 406 needs to, hear 62% of total power, and the remaining power is borne by two DC/DC conversion topological circuits 404 and 405; however, two topological circuits 204 having a principle as shown in FIG. 2 in the prior art need to initiate a special non-linear current and voltage double-loop control strategy, and they are difficult to achieve besides a calculation theory is complicated.

Principles of the three-phase rectification unit 401 and the three-phase bi-directional commutation unit 402 in an embodiment of the disclosure are as follows.

Now, one intact power frequency period is equally divided into six parts, and thus the three-phase rectification unit 401 and the three-phase bi-directional commutation unit 402 have six switch states in a period of time corresponding to each part, which are {S1, ..., S6}.

(1) when a voltage $V_{A-B}$ between three-phase AC power supply A and B lines is from negative to positive, namely, "$V_{A-B} \to 0+$" occurs, a state is called S1. At this moment, a bi-directional rectification switch $T_{AL}$ is turned off, a bi-directional rectification switch $T_{BL}$ is turned on, namely, "$T_{AL}$='0', $T_{BL}$='1'", a bi-directional commutation switch $X_A$ is turned off, and a bi-directional commutation switch $X_C$ is turned on namely, "$X_A$='0', $X_C$='1'";

(2) when a voltage $V_{C-A}$ between three-phase AC power supply C and A lines is from negative to positive, namely, "$V_{C-A} \to 0-$" occurs, a state is called S2. At this moment, a bi-directional rectification switch $T_{CH}$ is turned off, a bi-directional rectification switch $T_{AH}$ is turned on, namely, "$T_{CH}$='0', $T_{AH}$='1'", a bi-directional commutation switch $X_C$ is turned off, and a bi-directional commutation switch $X_B$ is turned on namely, "$X_C$='0', $X_B$='1'";

(3) when a voltage $V_{B-C}$ between three-phase AC power supply B and C lines is from negative to positive, namely, "$V_{B-C} \to 0+$" occurs, a state is called S3. At this moment, a bi-directional rectification switch $T_{BL}$ is turned off, a bi-directional rectification switch $T_{CL}$ is turned on, namely, "$T_{BL}$='0', $T_{CL}$='1'", a bi-directional commutation switch $X_B$ is turned off, and a bi-directional commutation switch $X_A$ is turned on namely, "$X_B$='0', $X_A$='1'";

(4) when a voltage $V_{A-B}$ between three-phase AC power supply A and B lines is from negative to positive, namely, "$V_{A-B} \to 0-$" occurs, a state is called S4. At this moment, a bi-directional rectification switch $T_{AH}$ is turned off, a bi-directional rectification switch $T_{BH}$ is turned on, namely, "$T_{AH}$='0', $T_{BH}$='1'", a bi-directional commutation switch $X_A$ is turned off, and a bi-directional commutation switch $X_C$ is turned on namely, "$X_A$='0', $X_C$='1'";

(5) when a voltage $V_{C-A}$ between three-phase AC power supply C and A lines is from negative to positive, namely, "$V_{C-A} \to 0+$" occurs, a state is called S5. At this moment, a bi-directional rectification switch $T_{CL}$ is turned off, a bi-directional rectification switch $T_{AL}$ is turned on, namely, "$T_{CL}$='0', $T_{AL}$='1'", a bi-directional commutation switch $X_C$ is turned off, and a bi-directional commutation switch $X_B$ is turned on, namely, "$X_C$='0', $X_B$='1'";

(6) when a voltage $V_{B-C}$ between three-phase AC power supply B and C lines is from negative to positive, namely, "$V_{B-C} \to 0-$" occurs, a state is called S6. At this moment, a bi-directional rectification switch $T_{BH}$ is turned off, a bi-directional rectification switch $T_{CL}$ is turned on, namely, "$T_{BH}$='0', $T_{CH}$='1'", a bi-directional commutation switch $X_B$ is turned off, and a bi-directional commutation switch $X_A$ is turned on namely, "$X_B$='0', $X_A$='1'";

The description of the above "six-state nine-variable" description machine is shown in table as follows.

| State | Period | Zero cross and state change | commutation/ rectification half-bridge | Bi-directional switch commutation |
|---|---|---|---|---|
| S1 | 0°~60°   | $V_{A-B} \to 0+$ | $T_{AL}$ = '0', $T_{BL}$ = '1' | $X_A$ = '0', $X_C$ = '1' |
| S2 | 60°~120° | $V_{C-A} \to 0-$ | $T_{CH}$ = '0', $T_{AH}$ = '1' | $X_C$ = '0', $X_B$ = '1' |
| S3 | 120°~180°| $V_{B-C} \to 0+$ | $T_{BL}$ = '0', $T_{CL}$ = '1' | $X_B$ = '0', $X_A$ = '1' |
| S4 | 180°~240°| $V_{A-B} \to 0-$ | $T_{AH}$ = '0', $T_{BH}$ = '1' | $X_A$ = '0', $X_C$ = '1' |
| S5 | 240°~300°| $V_{C-A} \to 0+$ | $T_{CL}$ = '0', $T_{AL}$ = '1' | $X_C$ = '0', $X_B$ = '1' |
| S6 | 300°~360°| $V_{B-C} \to 0-$ | $T_{BH}$ = '0', $T_{CH}$ = '1' | $X_B$ = '0', $X_A$ = '1' |

When the three-phase single-stage switch power supply is only used for an AC/DC rectification and conversion work mode, six rectification switches of the commutation unit 401 can be replaced by six power diodes, triodes of the three-phase hi-directional commutation unit 402 are maintained, in such a way, twelve control variables are further simplified to only three control variables or called bi-directional commutation variables, and the principle is as follows.

Now, one intact power frequency AC period is still equally divided into six parts, and thus the three-phase bi-directional commutation unit 402 have six switch states on a period of time corresponding to each part, which are {S1, . . . , S6}.

(1) when a voltage $V_{A-B}$ between three-phase AC power supply A and B lines is from negative to positive, namely, "$V_{A-B}\rightarrow 0+$" occurs, a state is called S1. At this moment, a bi-directional commutation switch $X_A$ is turned off, and a bi-directional commutation switch $X_C$ is turned on, namely, "$X_A$='0', $X_C$='1'";

(2) when a voltage $V_{C-A}$ between three-phase AC power supply C and A lines is from negative to positive, namely, "$V_{C-A}\rightarrow 0-$" occurs, a state is called S2. At this moment, a bi-directional commutation switch $X_C$ is turned off, and a bi-directional commutation switch $X_B$ is turned on, namely, "$X_C$='0', $X_B$='1'";

(3) when a voltage $V_{B-C}$ between three-phase AC power supply B and C lines is from negative to positive, namely, "$V_{B-C}\rightarrow 0+$" occurs, a state is called S3. At this moment, a bi-directional commutation switch $X_B$ is turned off, and a bi-directional commutation switch $X_A$ is turned on, namely, "$X_B$='0', $X_A$='1'";

(4) when a voltage $V_{A-B}$ between three-phase AC power supply A and B lines is from negative to positive, namely, "$V_{A-B}\rightarrow 0-$" occurs, a state is called S4. At this moment, a bi-directional commutation switch $X_A$ is turned off, and a bi-directional commutation switch $X_C$ is turned on, namely, "$X_A$='0', $X_C$='1'";

(5) when a voltage $V_{C-A}$ between three-phase AC power supply C and A lines is from negative to positive, namely, "$V_{C-A}\rightarrow 0+$" occurs, a state is called S5. At this moment, a bi-directional commutation switch $X_C$ is turned off, and a bi-directional commutation switch $X_B$ is turned on, namely, "$X_C$='0', $X_B$='1'";

(6) when a voltage $V_{B-C}$ between three-phase AC power supply B and C lines is from negative to positive, namely, "$V_{B-C}\rightarrow 0+$" occurs, a state is called S6. At this moment, a bi-directional a bi-directional commutation switch $X_B$ is turned off, and a bi-directional commutation switch $X_A$ is turned on, namely, "$X_B$='0', $X_A$='1'";

The description of the above "six-state nine-variable" description machine is shown in table as follows.

| State | period | Zero cross and state change | Bi-directional switch commutation |
|---|---|---|---|
| S1 | 0°~60° | $V_{A-B}\rightarrow 0+$ | $X_A$ = '0', $X_C$ = '1' |
| S2 | 60°~120° | $V_{C-A}\rightarrow 0-$ | $X_C$ = '0', $X_B$ = '1' |
| S3 | 120°~180° | $V_{B-C}\rightarrow 0+$ | $X_B$ = '0', $X_A$ = '1' |
| S4 | 180°~240° | $V_{A-B}\rightarrow 0-$ | $X_A$ = '0', $X_C$ = '1' |
| S5 | 240°~300° | $V_{C-A}\rightarrow 0+$ | $X_C$ = '0', $X_B$ = '1' |
| S6 | 300°~360° | $V_{B-C}\rightarrow 0-$ | $X_B$ = '0', $X_A$ = '1' |

The principle of a three-topology DC/DC conversion unit 403 of the disclosure is as follows.

Complicated theoretical derivation, simulation and experiments indicate that when a circuit of the disclosure is applied to a three-phase AC/DC conversion power supply, the electric power of converting the three-phase AC power supply 400 into an impulse DC power supply via the three-phase rectification unit 401 is about 62% of the total electric power of a three-phase incoming line, while the electric power of converting the three-phase AC power supply 400 into a fluctuation DC power supply via the three-phase bi-directional commutation unit 402 is about 38% of the total electric power of the three-phase incoming line, namely, a ratio of the electric power supply conversion bearing capacity of the impulse DC power supply to the electric power supply conversion bearing capacity of the fluctuation DC power supply is 65:40. Thus, a main topological circuit DC/DC403 in the three-topology unit needs to digest the power of 62%, while the other two assisted topological circuits DC/DC404 and DC/DC405 need to digest the remaining power of 38%.

When the circuit of the disclosure is applied to a three-phase DC/AC inversion power supply, the electric power of converting an impulse DC power supply via the three-phase rectification unit 401 is about 62% of the total electric power of a three-phase incoming line, while the electric power of converting a fluctuation DC power supply via the three-phase bi-directional commutation unit 402 is about 38% of the total electric power of the three-phase incoming line, namely, a ratio of the contribution capacity of the impulse DC power supply on a three-phase power output to the contribution capacity of the fluctuation DC power supply on the three-phase power output is 65:40. Thus, a main topological circuit DC/DC 406 in the three-topology unit needs to provide the power of 62% for the three-phase commutation unit 401, while the other two assisted topological circuits DC/DC404 and DC/DC405 need to provide the remaining power of 38% for the three-phase commutation unit 402. In such a way, under these two application modes, the three-phase single-stage switch power supply will work at an optimal state, namely, has an optimal three-phase power factor correction ability and optimal power supply conversion efficiency.

Figure 6:
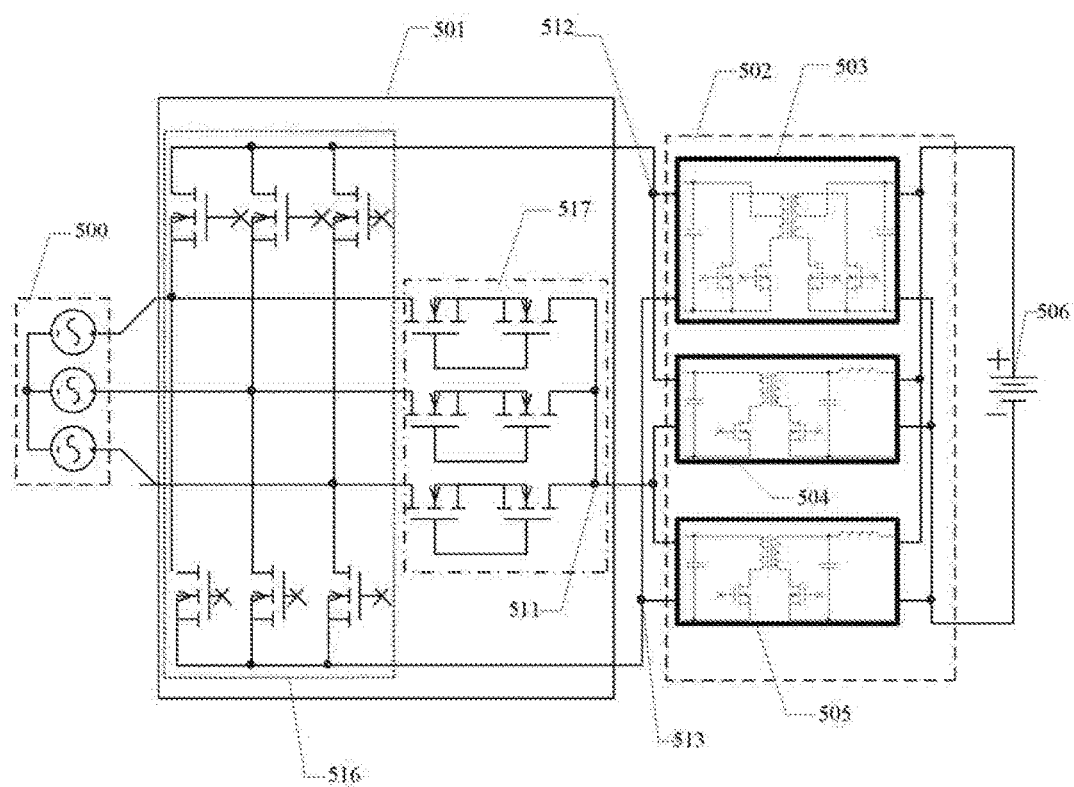
FIG. 6 is a structural block diagram of a three-phase single-stage bi-directional switch power supply circuit according to embodiments of the disclosure.

Some embodiments of the disclosure disclose a three-phase single-stage bi-directional switch power supply circuit, as shown in FIG. 6, including: a three-phase rectification unit 501 in which the working states of nine switch elements, under a three-phase AC/DC conversion working mode or a three-phase DC/AC inversion working mode, are based on the operation mechanism of the above "six-state nine-variable" state machine; also including, a DC/DC conversion unit 502 in which a subunit 503 is a main DC/DC conversion unit, and subunits 504 and 505 are assisted DC/DC conversion units. Switch devices used in a rectification unit are all N-channel field effect tubes, and other possible switch devices are used in practical application to be achieved.

A three-phase power rectification unit 516 has three rectification half-bridges each of which is achieved by two N-channel field effect tubes connected in series from top to bottom in the same direction.

A three-phase power commutation unit 517 also has three commutation half-bridges each of which is achieved by two N-channel field effect tubes connected in series from left to right in the opposite direction.

When this circuit is in a DC/AC inversion working state, a direct-current inversion power supply 506 is connected to the three-topology DC/DC conversion unit 502 as its input source. A main topology in three topologies bears about 62% of total conversion power, the input DC power supply is converted into a path of power frequency DC power supplies 512 and 513, two assisted topologies 504 and 505 in the three topologies bear about 38% of total conversion power, and the input DC power supply is converted, into a path of power frequency fluctuation DC power supply 511, The three-phase rectification unit 50 includes three unidirectional half-bridge switch circuits 516 used for converting the above power frequency impulse DC power supplies 512 and 513 into the three-phase AC power supply 500, and also includes three bi-directional commutation switch circuits 517 used for converting the above power frequency fluctuation DC power supply 511 into the three-phase AC power supply 500.

When this circuit is in an AC/DC conversion working state, the three-phase rectification unit 501 includes three unidirectional half-bridge switch circuits 516 used for converting alternating current input by the three-phase AC power supply 500 into a path of power frequency impulse DC sources 512 and 513 and also includes a three bi-directional commutation switch circuit 517 used for converting alternating current input by the three-phase AC source 500 into a path of power frequency fluctuation DC source 511; a three-topology DC/DC conversion unit 502 includes a main DC/DC topological subunit 503 bearing about 62% of total conversion power and used for transforming a path of the above power frequency impulse DC sources 512 and 513 into a DC power supply required by a load 406; two assisted DC/DC topological subunits 504 and 505 bear about 38% of total conversion power and are used for transforming a path of the above power frequency DC source into a DC power supply required by a load 506.

Figure 7:
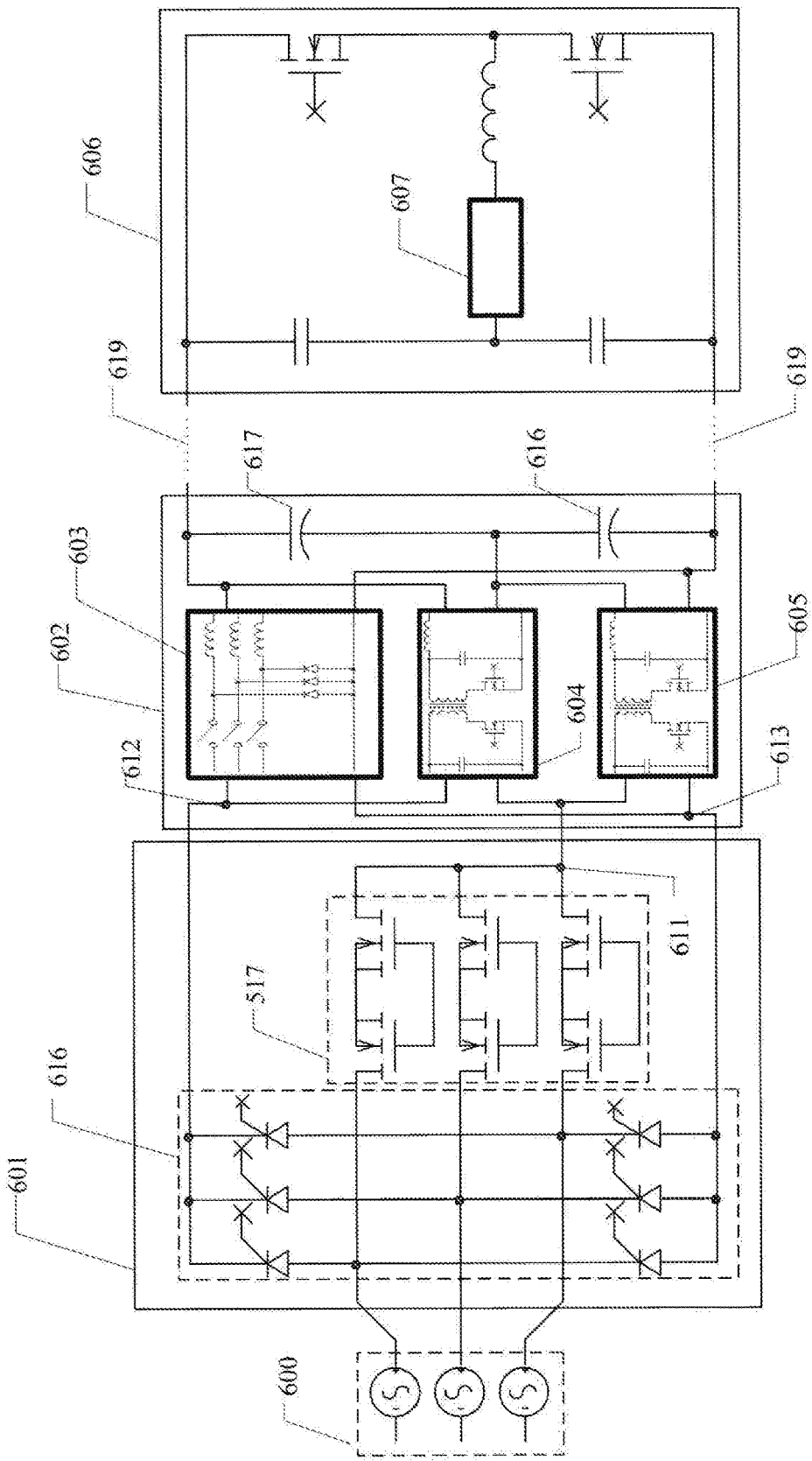
FIG. 7 is a circuit structure block diagram of an embodiment of a three-phase single-stage unidirectional switch power supply according to embodiments of the disclosure.

Some embodiments of the disclosure disclose a three-phase single-stage AC/DC non-isolated step-down DC source and high voltage direct current (HVDC) illumination source system, as shown in FIG. 7, which includes a three-phase AC rectification unit 601 containing three silicon-controlled half-bridge circuits 616 or power diode half-bridge circuits 616 used for converting alternating current input by the three-phase AC power supply 600 into a path of power frequency impulse DC sources 612 and 613, and also includes three bi-directional commutation switch circuits 617 used for converting alternating current input by the three-phase alternating power source 500 into a path of power frequency fluctuation DC source 611; also includes a three-topology DC/DC conversion unit 602 including a main DC/DC topological subunit 603 which adopts a multi-phase step-down high-frequency switch circuit and bears about 62% of total conversion power and is used for converting a path of the above power frequency impulse DC power supplies 612 and 613 into a DC power supply required by a high voltage direct current (HVDC) transmission, bus 619, and two assisted DC/DC topological subunits 604 and 605 which both adopt a step-down flyback type high-frequency switch circuit and adopt a secondary lossless clamping method disclosed in published patent "single-stage switch power source and control method thereof" (PCT international application No. PCT/CN2012/087128), respectively bears about 19% of total conversion power and are used for converting a path of the above power frequency fluctuation DC power supply 611 into a DC power supply required by a high voltage direct current (HVDC) transmission bus 619, wherein, the output power of the assisted DC/DC sub-topological circuit 604 is borne h an energy-storage capacitor 617, the output power of the assisted DC/DC sub-topological circuit 605 is borne by the energy-storage capacitor 617, and the beneficial effects are that implementation cost of the flyback switch circuit is reduced, and the efficiency of the conversion switch circuit is promoted, and practicability is enhanced, also included is a high frequency switch driving circuit 606 for lamp illumination, which is used for acquiring DC source power required by, a high voltage direct current (HVDC) transmission bus 619, and fits to a gas discharge lamp HID 607 or an LEI) lamp 607.

The circuit topology of the disclosure reduces the control variables involved in the prior art and is capable of significantly reducing the complexity of controlling three-phase rectification or commutation of the three-phase power supply, and control of each of three DC/DC topological circuits adopted in the disclosure only needs to use a common voltage control loop without initiating special non-linear current and voltage double-loop control strategy, thereby simplifying calculation theory.

Figure 8:
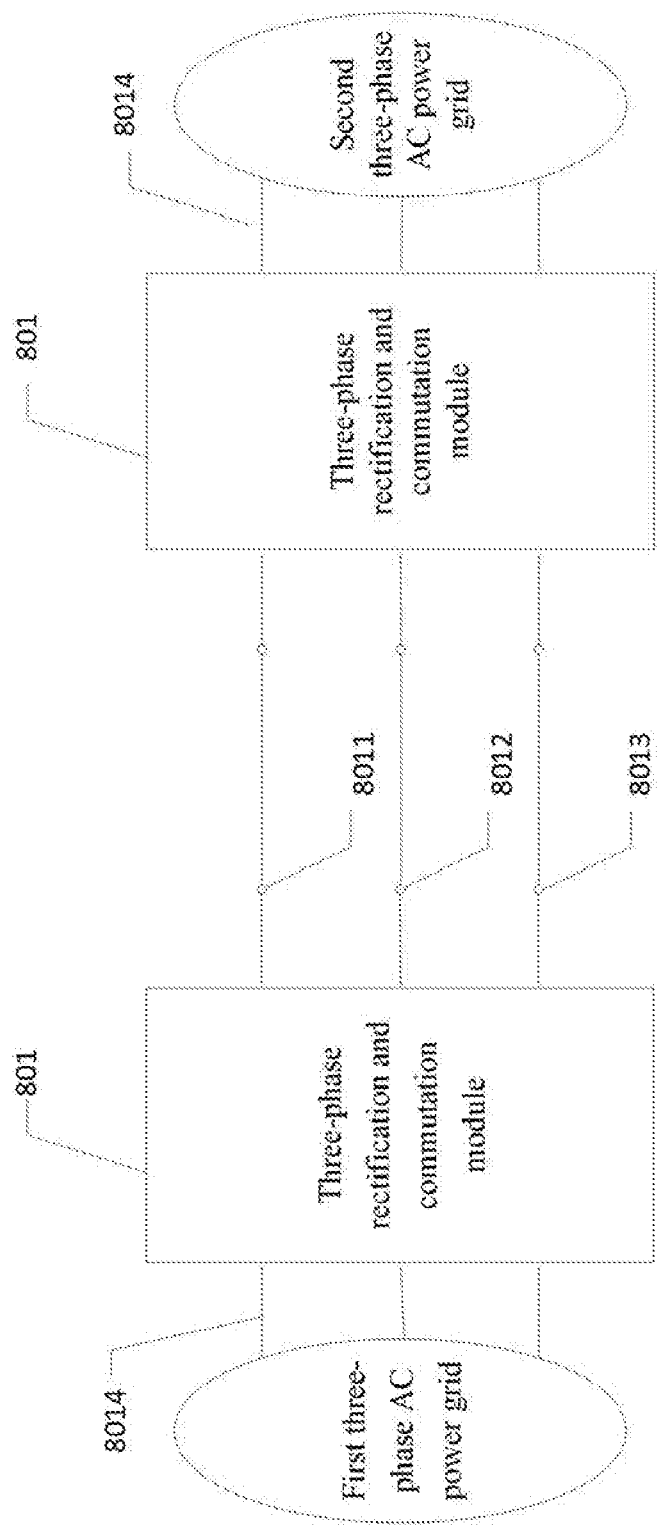
FIG. 8 is a diagram of a power line transmission device according to embodiments of the disclosure.

Meanwhile, as shown in FIG. 8, the disclosure also discloses a power line transmission device, which is used for transmitting electric power of a first three-phase AC power grid to a second three-phase AC power grid, wherein the power line transmission device includes: two three-phase rectification and commutation modules 801;

the two three-phase rectification and commutation modules 801 have a three-phase AC connection end 8014, a DC source first connection end 8011, a DC source second connection end 8012 and a DC source third connection end 8013, respectively;

the three phase AC connection end 8014 of the three-phase rectification and commutation module is connected to a first three-phase AC power grid, the DC source first connection end of the three-phase rectification and commutation module is connected to the DC source first connection end of another three-phase rectification and commutation module, the DC source second connection end is connected to the DC source second connection end of another three-phase rectification and commutation module, the DC source third connection end is connected to the DC source third connection end of another three-phase rectification and commutation module, and the three-phase AC connection end of another three-phase rectification and commutation module is connected to a second three-phase AC power grid.

Figure 9:
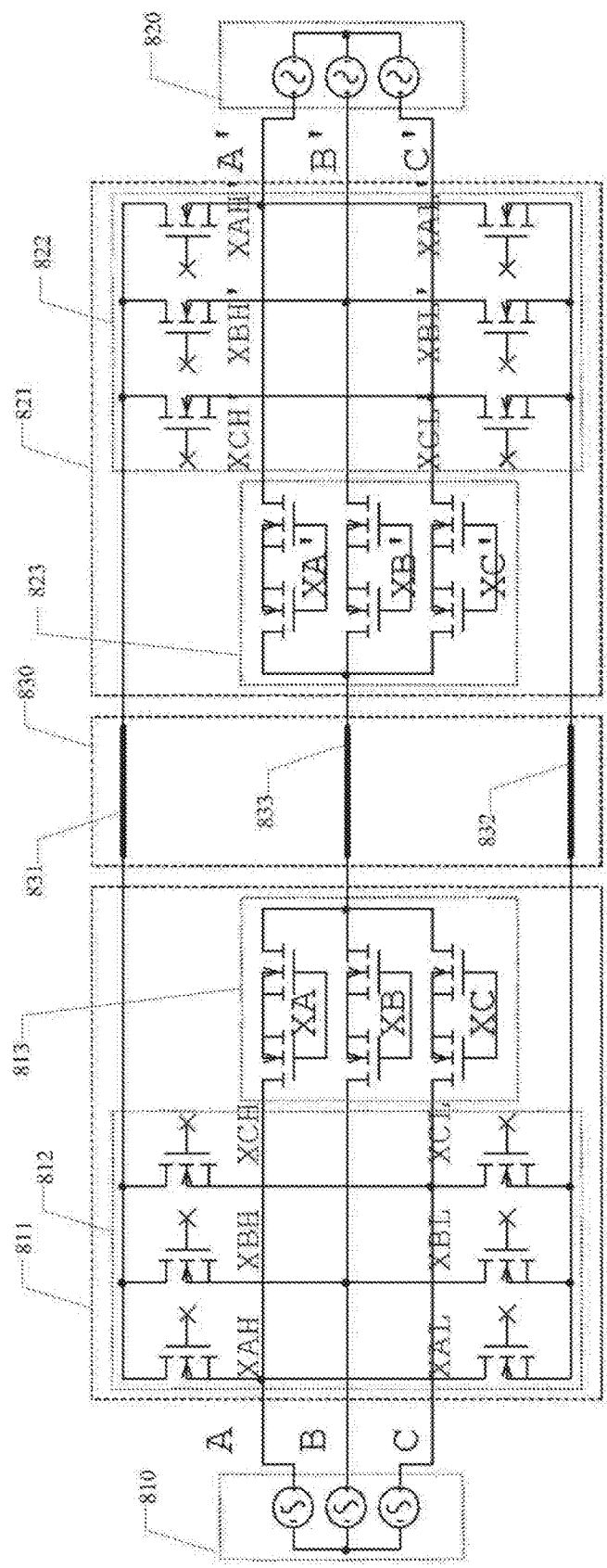
FIG. 9 is a circuit structural diagram of a power line transmission embodiment of a three-phase single-stage two-level switch power supply according to embodiments of the disclosure.

Some embodiments disclose a circuit system structure adopted in a three-phase single-stage two-level switch power line transmission embodiment. As shown in FIG. 9, the circuit system structure includes a first three-phase AC power grid 810, a three-phase rectification and conversion unit 811 and a three-line power line transmission line 830; wherein, the three-phase rectification and conversion unit 811 contains a three-phase rectification or inversion unit 812 which consists of three two-level half-bridge switch circuits XAH, XAL, XBH, XBL, XCH and XCL, and a three-phase commutation unit 813 which consists of three bi-directional commutation switch circuits XA, XB and XC; the three-line power line transmission line 830 contains a DC source first public connection end 831, a DC source second public connection end 832 and a DC source third public connection end 833;

this circuit system also contains second three-phase AC power grid 820, a three-phase rectification and conversion unit 821 and a three-line power line transmission line 830; wherein, the three-phase rectification and conversion unit 821 contains a three-phase rectification or inversion unit 822 which consists of three two-level half-bridge switch circuits XAH', XAL', XBH', XBL', XCH' and XCL' and a three-phase commutation unit 823 which consists of three bi-directional commutation switch circuits XA', XB' and XC'; the three-line power transmission line 830 contains a DC source first public connection end 831, a DC source second public connection end 832 and a DC source third public connection end 833.

This circuit system aims to a the electric power of the first three-phase AC power grid 810 to the second three-phase AC power grid 820 in a direct-current transmission manner. Its working principle is as follows: the electric power of e first three-phase AC power grid 810 becomes a DC power supply after undergoing commutation via the three-phase rectification and conversion unit 811, and is loaded to the three-line power line transmission line 830 through the DC source first public connection end 831, the DC source second public connection end 832 and the DC source third public connection end 833; direct-curve power transmitted by a long-distance power line transmission line 830 is recovered to three-phase alternating current again after undergoing commutation via the three-phase rectification and conversion unit 821 to be transmitted to the second three-phase AC power grid 820. In this circuit system, the circuit structure and the manipulation manner of the three-phase rectification and conversion unit 811 are completely identical to those of the three-phase rectification and conversion unit 821, and they are both consistent with the working principle of related rectification and commutation described in embodiment.

Figure 10:
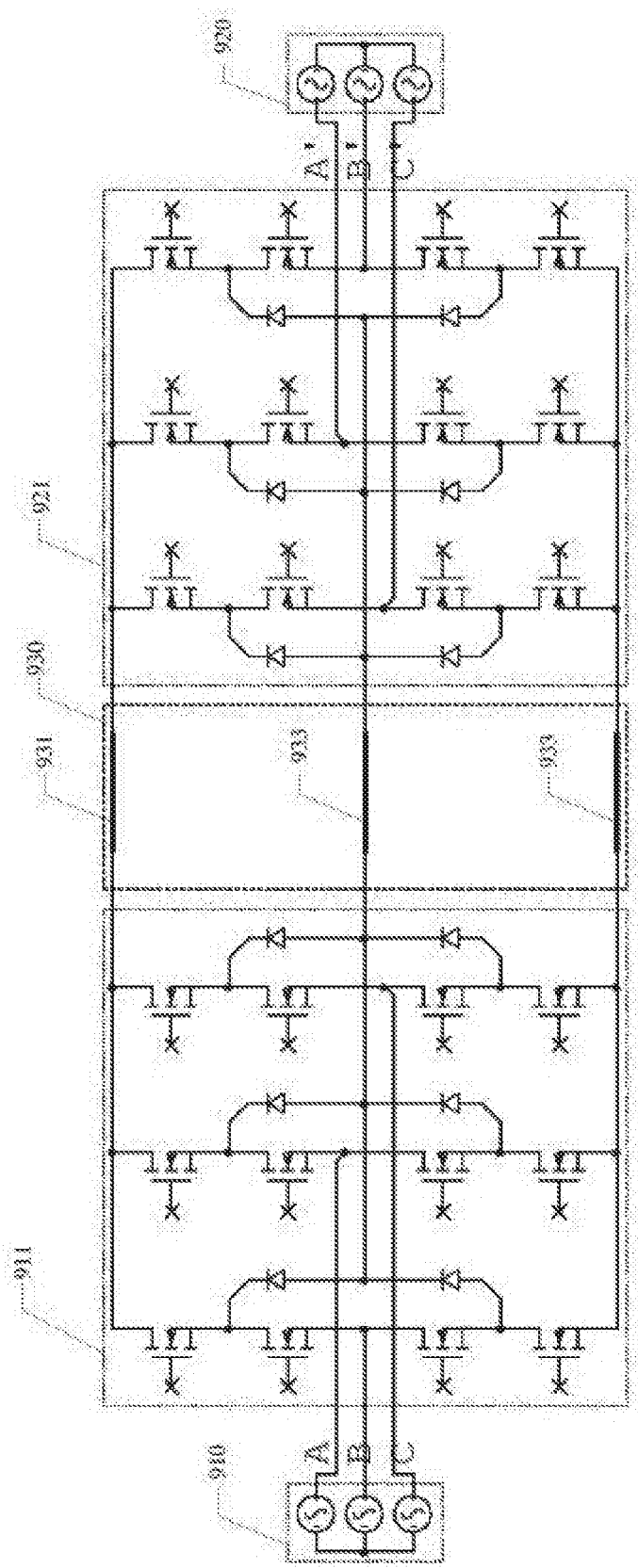
FIG. 10 is a circuit structural diagram of a power line transmission embodiment of a three-phase single-stage three-level switch power supply according to embodiments of the disclosure.

Some embodiments disclose a circuit system structure of a three-phase single-stage three-level switch power line transmission embodiment. As shown in FIG. 10, the circuit system structure includes a first three-phase AC pokier grid 910, a three-phase rectification and conversion unit 911 and a three-line power line transmission line 930; wherein, the three-phase rectification and conversion unit 911 consists of three three-level half-bridge switch circuits; the three-line power line transmission line 930 contains a DC source first public connection end 931, a DC source second public connection end 932 and a DC source third public connection end 933.

This circuit system also contains a second three-phase AC power grid 920, a three-phase rectification and conversion unit 921 and a three-line power line transmission line 930; wherein, the three-phase rectification and conversion unit 921 consists of three two-level half-bridge switch circuits; the three-line power line transmission line 930 contains a DC source first public connection end 931, a DC source second public connection end 932 and a DC source third public connection end 933.

This circuit system aims to transmit the electric power of the first three-phase AC power grid 910 to the second three-phase AC power grid 920 in a direct-current power line transmission manner. Its working principle is as follows: the electric power of the first three-phase AC power grid 910 becomes a DC power supply after undergoing commutation via the three-phase transformation unit 911, and is loaded to the three-line power line transmission line 930 through the DC source first public connection end 931, the DC source second public connection end 932 and the DC source third public connection end 933; direct-current electric, power transmitted by a long-distance power line transmission line 930 is recovered to three-phase alternating current again after undergoing commutation via the three-phase rectification and conversion unit 921 to be transmitted to the second three-phase AC power grid 920.

In the disclosure, the principle and embodiments of the disclosure are described by applying embodiments, the illustration of the above embodiments are only for helping to understand the method of the disclosure and its core thought; meanwhile, for those of ordinary skill in the art, modifications are made to embodiments and an application range according to the concept of the disclosure. In summary, the content of the disclosure should not be understood as limiting the disclosure.

We claim:

1. A single-stage three-phase power supply conversion device for achieving AC/DC or DC/AC conversion between a three-phase AC source and a DC source, comprising: a three-phase rectification and commutation module and a DC/DC conversion module;

wherein, the three-phase rectification and commutation module has a three-phase AC connection end, a DC source first connection end, a DC source second connection end and a DC source third connection end, and the DC/DC conversion module has a first connection end, a second connection end, a third connection end, a DC source positive connection end and a DC source negative connection end;

the three-phase AC source is connected to the three-phase AC connection end of the three-phase rectification and commutation module, the DC source first connection end of the three-phase rectification and commutation module is connected to the first connection end of the DC/DC conversion module, the DC source second connection end is connected to the second connection end of the DC/DC conversion module, the DC source third connection end is connected to the third connection end of the DC/DC conversion module, a positive end of the DC source is connected to the DC source positive connection end of the DC/DC conversion module, and a negative end of the DC source is connected to the DC source negative connection end of the DC/DC conversion module;

wherein, the three-phase rectification and commutation module includes: a three-phase rectification unit and a three-phase commutation unit; the three-phase rectification unit and the three-phase commutation unit are connected to the three-phase AC connection end of the three-phase rectification and commutation module through respective three connection terminals and hence connected with the three phases of the three-phase AC source respectively;

the three-phase rectification unit is connected to the first connection end of the DC/DC conversion module through the DC source first connection end, and is connected to the second connection end of the DC/DC conversion module through the DC source second connection end;

the three-phase commutation unit is connected to the third connection end of the DC/DC conversion module through the DC source third connection end;

wherein, the DC/DC conversion module includes: a first DC/DC conversion unit, a second DC/DC conversion unit and a third DC/DC conversion unit;

the first, second and third DC/DC conversion units each has a positive input end, a negative input end, a positive output end and a negative output end, respectively;

the positive input end of the first DC/DC conversion unit and the positive input end of the third DC/DC conversion unit are both connected to the first connection end of the DC/DC conversion module;

the negative input end of the second DC/DC conversion unit and the negative input end of the third DC/DC conversion unit are connected to the second connection end of the DC/DC conversion module;

the negative input end of the first DC/DC conversion unit and the positive input end of the second DC/DC conversion unit are connected to the third connection end of the DC/DC conversion module, the positive output ends of the first, second and third DC/DC comers are all connected to the positive end of the DC source, and the negative output ends of the first, second and third DC/DC conversion units are all connected to the negative end of the DC source.

2. The single-stage three-phase power supply conversion device according, to claim 1, wherein, the three-phase AC connection end of the three-phase rectification and commutation module has three connection terminals which are respectively connected to three phases of the three-phase AC source.

3. The single-stage three-phase power supply conversion device according to claim 1, wherein, when DC/DC conversion is performed, the three-phase rectification and commutation module is used for converting three-phase alternating current input by the three-phase AC source into a first DC source and a second DC source and the DC/DC conversion module performs power conversion on the first DC source and the second DC source into direct current to be output to the DC source.

4. The single-stage three-phase power supply conversion device according to claim 1, wherein, the three-phase rectification unit is used for converting three-phase alternating current into the first DC source; and the three-phase commutation unit is used for converting three-phase alternating current into the second DC source.

5. The single-stage three-phase power supply conversion device according to claim 1, wherein, when DC/AC conversion is performed, the DC/DC conversion module converts the DC source into a first DC source and a second DC source, and the three-phase rectification and commutation module converts the first DC source and the second DC source into three-phase alternating current to be output to the three-phase AC source.

6. The single-stage three-phase power supply conversion device according to claim 1, wherein, the three-phase rectification unit is used for converting the first DC source into three-phase alternating current; and the three-phase commutation unit is used for converting the second DC source into three-phase alternating current.

7. A power line transmission device for transmitting electric power from a first three-phase AC power grid to a second three-phase AC power grid, comprising: two three-phase rectification and commutation modules;

wherein, the two three-phase rectification and commutation modules each has a three-phase AC connection end a DC source first connection end, a DC source second connection end and a DC source third connection end, respectively;

the three phase AC connection end of one three-phase rectification and commutation module is connected to the first three-phase AC power grid, the DC source first connection end of the three-phase rectification and commutation module is connected to the DC source first connection end of the other three-phase rectification and commutation module the DC source second connection end is connected to the DC source second connection end of the other three-phase rectification and commutation module, the DC source third connection end is connected to the DC source third connection end of the other three-phase rectification and commutation module, and the three-phase AC connection end of the other three-phase rectification and commutation module is connected to the second three-phase AC power grid;

wherein, the three-phase rectification and commutation module includes: a three-phase rectification unit and a three-phase commutation unit; the three-phase rectification unit and the three-phase commutation unit are connected to three phases of a three-phase AC power grid through respective three connection terminals;

the three-phase rectification unit is connected to the DC source first connection end and the DC source second connection end of the other three-phase rectification and commutation module through the DC source first connection end and the DC source second connection end;

the three-phase commutation unit is connected to the DC source third connection end of the other three-phase rectification and commutation module through the DC source third connection end.

8. The power line transmission device according to claim 7, wherein, the three-phase AC connection ends of the two three-phase rectification and commutation modules each has three connection terminals which are respectively connected to three phases of the first three-phase grid and the second three-phase AC power grid.

\* \* \* \* \*